United States Patent [19]

Waterston

[11] 3,905,382
[45] Sept. 16, 1975

[54] BACK FLOW PREVENTOR

[76] Inventor: William Waterston, 73, Kaikorai Valley Rd., Dunedin, New Zealand

[22] Filed: Sept. 28, 1973

[21] Appl. No.: 401,892

[52] U.S. Cl. ............................. 137/102; 137/218
[51] Int. Cl.² ....................................... G05D 7/00
[58] Field of Search ........... 137/218, 102, 107, 596, 137/627.5, 215, 216, 216.1, 216.2, 217; 251/52–53

[56] References Cited
UNITED STATES PATENTS

| | | | |
|---|---|---|---|
| 2,680,454 | 6/1954 | MacGlashan, Jr. | 251/52 X |
| 3,070,112 | 12/1962 | Fricke et al. | 137/102 |
| 3,171,423 | 3/1965 | Dillon | 137/218 |
| 3,498,056 | 3/1970 | Avery | 137/107 X |
| 3,744,507 | 7/1973 | Oberthur | 137/107 |

Primary Examiner—Martin P. Schwadron
Assistant Examiner—Robert J. Miller
Attorney, Agent, or Firm—Holman & Stern

[57] ABSTRACT

A back flow preventor for fluid supply systems as described having an inlet, an outlet and a relief outlet therebetween, a valve biased to close the inlet, a valve seat for the relief outlet at one end of a sleeve mounted concentric to the inlet, a piston reciprocable between said inlet and seat by pressure acting on opposed faces, the pressure area on the inlet face of the piston equalling the effective area of the seat to ensure immediate opening of the relief outlet. On back flow, the valve first closes the inlet and then the piston opens the relief outlet. Resilient seating means on the piston engages the valve seat and in one form also engages the valve. In another form, resilient means is provided on the valve for engaging a protruding portion of the piston.

4 Claims, 5 Drawing Figures

BACK FLOW PREVENTOR

BACKGROUND OF THE INVENTION

The present invention relates to devices for preventing back flow in fluid supply systems.

OBJECTS AND SUMMARY OF THE INVENTION

It is one object of the present invention to provide a device for preventing back flow in fluid supply systems incorporating means to automatically compensate for various pressure conditions therein and to maintain a pressure differential within the range of safe back pressures as determined by the construction of the device so that at all times it is impossible for back flow into the supply to occur. It is a further object to provide a fully differentially operating device of this type in which the effect of a lower pressure in a relief outlet provided in the device has no effect on the opening and closing of the relief valve seat for said outlet.

It is another object of the present invention to provide such a device which is of reasonable cost and efficient in operation.

According to one aspect of the present invention, a device for preventing back flow in fluid supply systems comprises a body member providing a chamber therein, a fluid inlet to said chamber, a fluid outlet from said chamber and a fluid relief outlet from said chamber between said inlet and said outlet, a valve member reciprocably mounted in said chamber and biased to close off flow from said fluid inlet into said chamber at a pre-determined pressure and means engageable with said valve member when said fluid inlet is closed, said means being movable to open a valve seat for the relief outlet when pressure build-up in the chamber due to back flow exceeds a further pre-determined pressure, the effective pressure area on said means being substantially equivalent to the effective area of the relief valve seat, the arrangement being such that pressure build-up in said chamber first closes off said inlet before movement of said means to open communication between said chamber and said relief outlet to effect fluid flow from said chamber through said relief outlet, and without needing to overcome any pressure differential across the relief valve seat caused by a lower pressure existing in the relief outlet.

Preferably, the means engageable with the valve member provides a valve seat thereon for the valve member. This valve seat is preferably provided by a resilient means provided on the downstream face of a member, such as a piston means, reciprocable within the body member, with said resilient means being engageable with the relief valve seat. The valve member is also preferably provided with resilient means provided on the upstream face which resilient means is engageable with a valve seat for the inlet.

A sleeve member is preferably mounted coaxially of the valve seat for the inlet having its upstream end forming a valve seat for the relief outlet and provided substantially coaxially of the valve seat for the inlet.

In order that the invention may be more readily understood several forms of the invention will be described below by way of example only and with reference to the accompanying drawings in which:

DETAILED DESCRIPTION OF THE EMBODIMENTS

Figure 1:
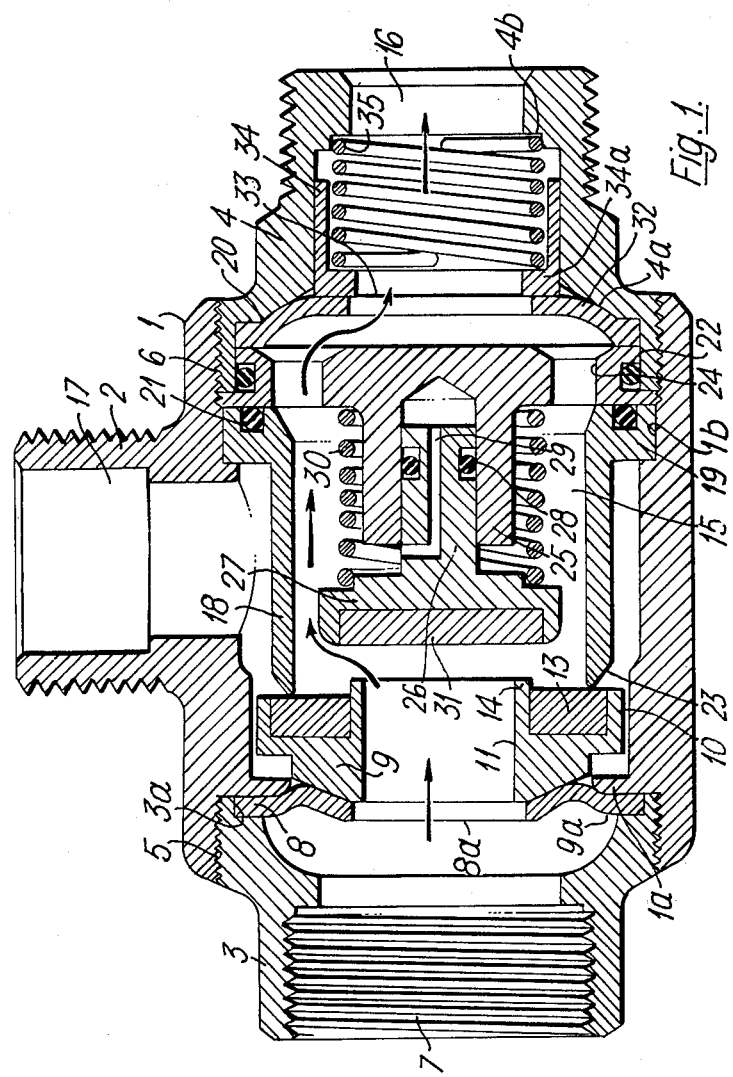
FIG. 1 is a longitudinal cross-sectional view through a preferred form of back flow preventor according to the present invention in the through-flow position.
Figure 2:
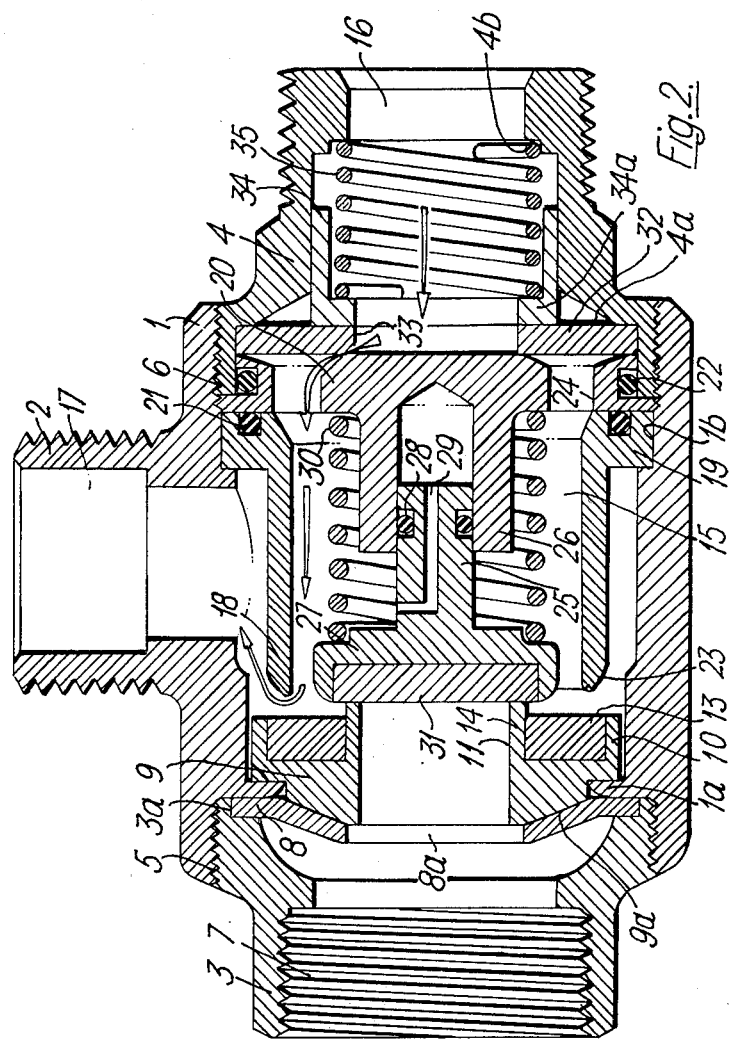
FIG. 2 is a similar view of the back flow preventor of FIg. 1 but in its back-flow condition.

The preferred form of back flow preventor shown in FIGS. 1 and 2 is formed with an outer casing 1, preferably cylindrical and provided with a relief outlet or connection 2 extending radially therefrom. An inlet connection 3 in the form of a sleeve member is suitably inserted into one open end of the casing 1 such as by screw-threading as shown at 5 and an outlet connection member 4 is inserted in the other open end of the casing 1 such as by screw-threading 6. The outer end portion of the inlet sleeve member 3 and outlet connection member 4 are suitably provided with means such as internal or external screw-threading to enable their connection to conduits or the like.

The inner end portion of the sleeve member 3 is provided with a suitable annular recess 3a to receive therein the outer marginal portion of an annular diaphragm 8, with the diaphragm 8 extending across the inner end of said sleeve member 3 and provided with a central aperture 8a therein.

An annular shoulder member 1a is provided on the inlet end of the casing 1 and against which the downstream face of the annular diaphragm 8 is engaged whereby the marginal portion of the diaphragm 8 is held between the shoulder 1a and the wall of the recess 3a in which it is engaged. A reciprocable member in the form of a piston member 9 and provided with a central bore 11 therethrough is provided with its upstream face 9a preferably tapered from its outer diameter inwardly thereof towards the inlet and the piston 9 is provided with a flange portion 10 on its downstream end. The outer diameter of the piston 9 is such as to enable its reciprocating movement within the casing within defined limits. The limit of its movement towards the inlet is set by the shoulder 1a against which the upstream face of the flange portion 10 may engage with the upstream face 9a of the piston 9 abutting the downstream face of the annular diaphragm 8. As shown in FIGS. 1 and 2, the inner end of the shoulder 1a is curved on the downstream face and the upstream face 9a of the piston is tapered to enable the efficient sealing of the diaphragm 8 against the piston 9.

A resilient annular seating member 13 is provided in an annular recess formed on the downstream face of the piston 9, namely the inward facing face and a projecting nose portion 14 of the piston member 9 protrudes beyond the seating member 13.

A chamber 15 is formed within the casing between an inlet 7 and an outlet 16 and from which chamber 15, a relief outlet 17 extends within the relief outlet connection 2.

A sleeve member 18 forms the walls of the chamber 15 substantially coaxially to the casing 1 and to the outlet 7 and outlet 16 and has a radially outwardly extending flange portion 19 engaging within a suitable formed increased diameter portion 1b in the inner surface of the casing 1 and near the outlet end thereof. A carrier member 20 is mounted within the casing 1 abutting the flanged end face of the sleeve member 18 and being held itself within the casing 1 by the outlet connection member 4. A suitable seal such as an O-ring seal 21 is provided within a suitable groove or recess formed within the end face of the flange of the sleeve member 18 for engagement with the inner end face of the carrier member 20 and similarly a seal member 22, such as an O-ring seal, is provided in a suitable recess formed in the outer peripheral curved surface of the carrier member 20 to provide a seal with the inner surface of the outlet connecting member 4 engaged therewith.

The sleeve member 18 extends from its flanged end on the outlet side of the chamber 15 longitudinally within the chamber to the inlet end thereof having its end face there preferably bevelled or tapered to provide a narrowed annular valve seat 23 for the relief outlet 17 and against which the annular seating member 13 in the downstream face of piston member 9 may engage to close off communication between the valve chamber 15 and the relief outlet 17. The effective area of the valve seat 23 is substantially equal to the effective pressure area of the piston 9 on which the pressure from inlet 7 acts, thus avoiding any influence on the piston 9 of the lower pressure in the relief outlet 17 from atmosphere and thus making the device a truly pressure differentially operating device for the full range of pressures for which the device is to be used.

The carrier member 20 is provided with apertures 24 therein through which the flow to the outlet port 16 occurs.

An annular diaphragm 32 is mounted within the inner end of the outlet connection member 4 having its outer marginal portion held between a shoulder 4a formed in the connection member 4 and the downstream face of the carrier member 20, with the diaphragm 32, extending across the apertures 24 and a central aperture 33 in the diaphragm when the diaphragm is closed, being positioned against the central portion of the carrier member 20 (See FIG. 2). A guide tube 34 slidably reciprocable within the inner diameter of the outlet connecting member 4 and provided with an inner shoulder 34a engages with the inner shoulder 34a against the downstream face of the annular diaphragm 32 (See FIG. 2). A coil spring 35 is provided within the guide tube 34 and has its outer end engaging against a suitably formed shoulder 46 in the outlet connecting member 4 and its inner end engaging the shoulder 34a of the guide tube 34, with the coil spring being arranged to close the diaphragm 32 against the carrier member 20.

The carrier member 20 has a guide tube 25 protruding therefrom substantially coaxially of the sleeve member 18 and toward the inlet end of the chamber 15 and formed preferably integral with the member 20. A valve body member is provided formed with a disc-like portion 27 and a stem-like portion 26, with the portion 26 being reciprocable within the guide tube 25. A sealing means, such as an O-ring seal 28 is preferably provided in a suitable recess within the outer surface of the stem-like portion 26 to introduce friction and thus steady the valve body member against vibration during its reciprocable movement.

Additional steadying is produced by utilizing a dashpot effect produced by the provision of a right-angled bore 29 communicating the space within the interior of the tube 25 and the chamber 15.

A coil spring 30 encircles the outer surface of the tube 25 with one end thereof engaging against the carrier 20 and the other end against the downstream face of the disc-like portion 27 of the valve body member. The front face of the disc-like portion 27 of the valve body member has a resilient seating member 31 which is preferably circular, mounted therein with the inflowing liquid from the inlet 7 being arranged to impinge on the member 31.

In FIG. 1, the solid arrows indicate the through-flow of the back flow preventor. Before the fluid supply is turned on, the piston body 9 and the valve body member 26, 27 will be positioned as shown in FIG. 2 with the inflow to the back flow preventor closed off by the engagement of the resilient seating member 31 on the protruding nose portion 14 of the piston 9 and with the piston member 9 in its most upstream position as shown in FIG. 2.

When the flow from the inlet 7 commences, fluid pressure acts on the upstream face of diaphragm 8 and on the face of the seating member 31. This fluid pressure moves the diaphragm 8 and the piston 9 therewith into the chamber 15 to its most downstream limit, namely to a position in which the annular seating member 13 engages the seat 23 at the end of the sleeve member 18. This thus closes off communication between the chamber 15 and the relief outlet 17. Then, with further increase in pressure acting on the face of the seating member 31 to overcome the effect of the coil spring 30, the valve body member 26,27 is moved out of contact with the protruding nose portion 14 of the piston 9 allowing the fluid to travel into the chamber 15 and to the ports 24 in the carrier member 20 and to open the diaphragm 33 against the spring 35 and to enable outflow through the outlet 16. When the flow to inlet 7 is turned off, the diaphragm 32 will normally close outlet 16 and valve body 26,27 close against nose 14, but seating 13 will remain closed against seat 23 as the pressure between the fluid supply and the diaphragm 8 is still the same as the instant flow ceased. Any head of fluid in the outlet 16 will normally be at a lower pressure than at inlet 7 and so back flow will not occur.

Spring 35 of the diaphragm 32 at the outlet is lightly loaded to ensure the positive closure thereof at a very low back pressure.

Should there be any form of back flow in the preventor, such as, for example, by virtue of the holding open of the diaphragm 32 due to foreign material existing there, this back flow indicated in unfilled arrows in FIG. 2 passes through the apertures 24 into the chamber 15. Should this back pressure increase beyond the normal static pressure therein determined by the force exerted by the spring 30, this increase in pressure in combination with the force of the springs 30 causes the valve body member 26,27 closed against nose portion 14 to move in unison with piston 9 toward the inlet 7 to the position indicated in FIG. 2, in which the annular seating member 13 is moved back from the valve seat 23 with the flow from the inlet closed off. Communication between chamber 15 and the relief outlet 17 is then effected around the annular seat 23 as indicated by the unfilled arrow.

A similar sequence will occur should the supply pressure in inlet 7 fall and approach the pressure in the chamber 15.

In both cases when the designed pressure difference between the inlet 7 and the chamber 15 has been restored by venting the chamber 15 through the relief outlet 17, the piston 9 will move to the relief seat 23 and make a seal with the seating member 13.

During the throughflow indicated in FIG. 1, the force exerted by the spring 30 on the valve body member 26,27 causes a pressure drop between the upstream face of the piston 9 and the downstream face, with this pressure difference acting to provide a closing force to close off the valve seat 23. With the shoulder 1a projecting into the casing a distance substantially equal to the diameter of valve seat 23, the closing force on the valve seat 23 is a product of the area encompassed by the valve seat 23 and the abovementioned pressure difference.

The opening characteristics of the back flow preventor can be varied by altering the effective pressure area of the valve seat and the pressure of the spring 30.

Figure 3:
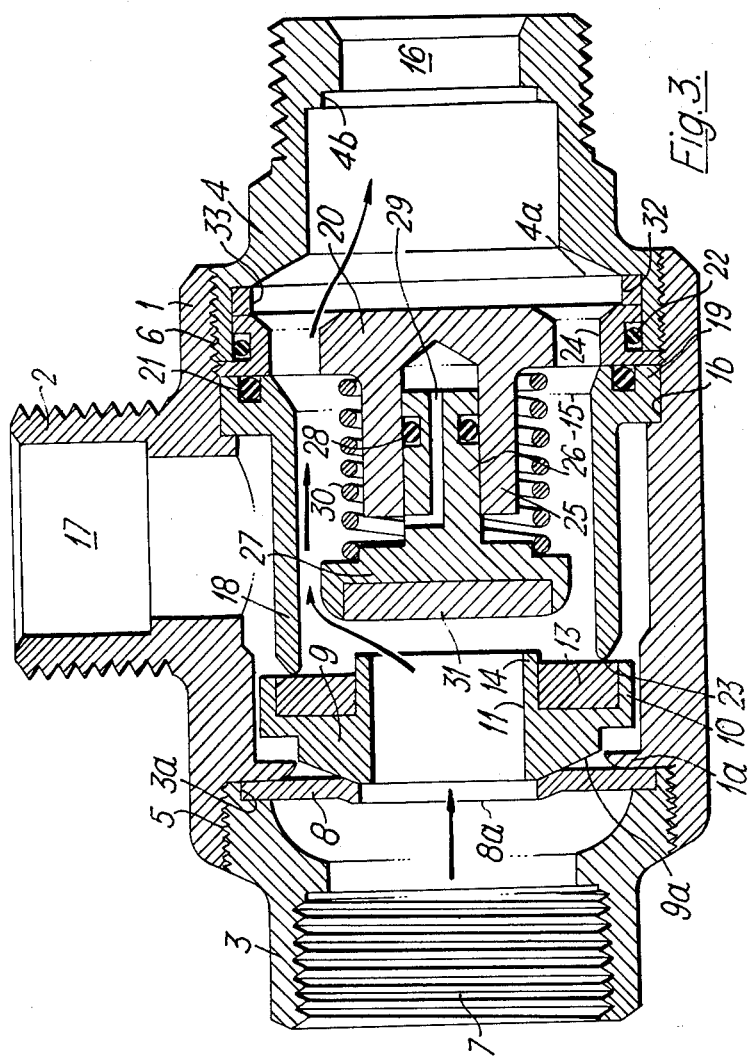
FIG. 3 is a further embodiment of the back flow preventor according to the present invention in a similar view to that of FIGS. 1 and 2 and in the throughflow condition.

In a further embodiment envisaged and shown in FIG. 3, the back flow preventor is substantially identical with that shown in FIGS. 1 and 2 (like parts being indicated by the same reference numerals) apart from the omission of the valving effect for the outlet with the same relief action being produced by any back flow from the outlet.

Figure 4:
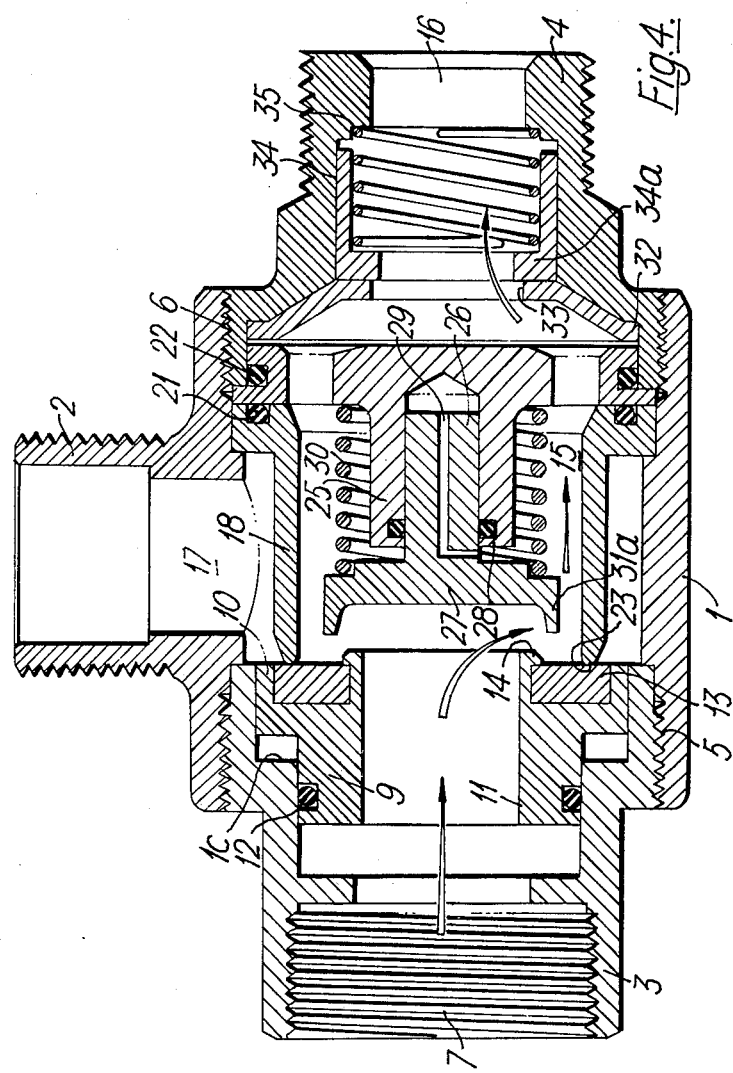
FIG. 4 is a longitudinal cross-sectional view through a further form of back flow preventor according to the present invention in the throughflow position.
Figure 5:
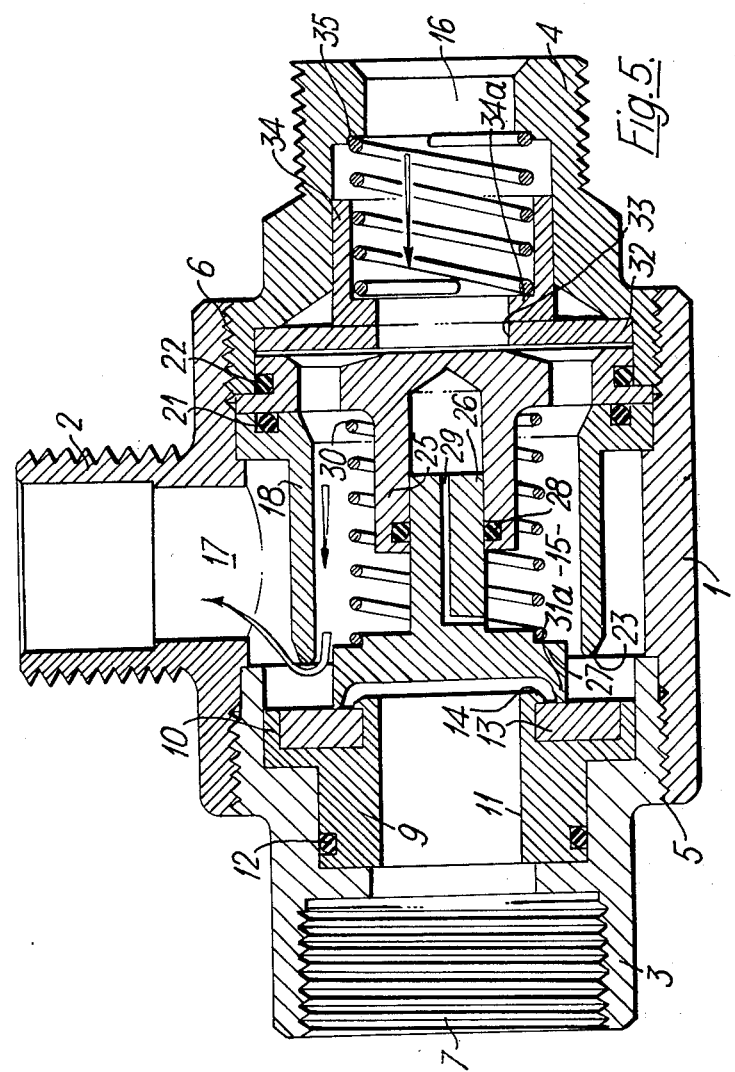
FIG. 5 is a similar view to FIG. 4 with the valve in the back flow condition.

In the further arrangement shown in FIGS. 4 and 5 in which similar parts are given like reference numerals, the inner end portion of the sleeve member 3 has its inner diameter enlarged to provide a shoulder 1c against which the flanged portion 10 of the piston 9 may engage when at its outer limit of movement. The piston 9 is, furthermore, of such dimensions as to be slidably reciprocable within the inner diameter of the sleeve member 3. A suitable sealing means such as an O-ring seal 12 is received in an appropriate annular groove in the outer peripheral surface of the piston member 9.

The resilient seating member 13 is provided in an annular recess formed on the downstream face of the piston 9 and held there by a thickened portion of the protruding nose 14 of the piston body. The valve body member 26,27 is modified in this arrangement in that no resilient seating member is provided on the upstream face of the disc-like portion 27, the marginal upstream portion 31 of the disc-like portion 27 protruding towards the inlet 7 for engagement under the appropriate pressure condition with the annular seating member 13 of the piston 9.

The area in compassed by the valve seat 23 is substantially equivalent to the effective pressure area on the upstream face of the piston 9 whereby the pressure in the relief outlet 17 has no effect on the opening of the valve seating member 13 from the relief valve seat 23.

The sealing member providing the steadying effect for the stem-like portion 26 of the valve body member 26,27 is provided in this arrangement in an annular groove formed in the guide tube 25.

The solid arrows in FIG. 4 indicate the throughflow of the back flow preventor and the unfilled arrows in FIG. 5 indicating the back flow. The operation of this embodiment of back flow preventor is similar to that shown in FIGS. 1, 2 and 3. When the flow from the inlet 7 commences, the arrangement is as shown in FIG. 5, and then fluid pressure acts on the upstream face of piston 9 and on the upstream face of the valve body member 26,27 and moves the piston 9 with the valve body member 26,27 closed thereagainst until the seating member 13 engages the valve seat 23 and thus reaches the other limit of movement of the piston 9. In this position, communication between the chamber 15 and relief outlet 17 is closed off. Then, with a further increase in pressure acting on the upstream face of the disc-like portion 27, the valve body member 26,27 is moved out of contact with the valve seating member 13, allowing the fluid to travel into the chamber 15 and out through the ports 24 in the carrier 20 and to the outlet port 16 to open the diaphragm 22 against the spring 33 and to enable outflow through outlet 16.

If the back pressure build-up in the device, beyond the normal static pressure determined by the product of the force exerted by the spring 30 and the effective pressure area of the seating washer 13 radially inwardly of the valve seat 23 on the sleeve member 18, when the back pressure in combination with the force of spring 30 exceeds the inlet pressure, the piston member 9 and the valve body member 26,27 moves towards inlet 27 to the position indicated in FIG. 5 with the valve seat 23 open and flow from the inlet closed off. Communication between chamber 15 and relief outlet 17 is then effected.

One main application for the back flow preventor according to the invention is its use on the outlet side of a stop tap supplying a hose or similar open system, where the maximum head obtainable on back pressure is below the safe limit determined by spring 30. A further application is the installation in a mains supply with a shut-off beyond the outlet of the unit. However, in that situation, the spring 30 and main valve seat must be great enough to ensure opening of the relief seat 23 before the mains pressure falls to the pressure in chamber 15.

It is envisaged that various modifications and alterations of the particular arrangements described above and shown in the drawings may be made within the scope of the appended claims such as by alteration of the dynamic sealing of the piston 9 from the central chamber 15 and modification of the types of seating for the relief valve seat and the main valve seat. For example, the solid materials and resilient materials may be reversed.

Thus, there is provided an efficient back flow preventor at reasonable manufacturing cost and which is able to maintain a pressure differential within a safe range of back pressure and to prevent back flow in any fluid supply system into which it is incorporated and which acts independently of a lower pressure such as atmospheric pressure in the relief port area.

I claim:

1. A device for preventing back flow in fluid supply systems which comprises a casing enclosing a fluid chamber, means defining a fluid inlet to said chamber, means defining a fluid outlet from said chamber, means defining a fluid relief outlet from said chamber between said inlet and said outlet, a reciprocable member slidably mounted within said body member adjacent said inlet, means defining a valve seat for said inlet on said reciprocable member, a valve member mounted in said chamber, a biasing means for said valve member to bias said valve member to close against said valve seat, a sleeve member mounted within said chamber coaxially of said valve seat, said sleeve member having an upstream end, a valve seat for said relief outlet provided at the upstream end of said sleeve member, said reciprocable member being movable into engagement with said valve seat for the relief outlet by pressure on its upstream face and being movable to open the valve seat for the relief outlet when pressure build-up in the chamber due to back flow exceeds a further predetermined pressure, the effective pressure area of said upstream face being substantially equivalent to the effective pressure area of the valve seat for the relief outlet, the arrangement being such that said pressure build-up and said bias first moves said valve member to close off said inlet before movement of said reciprocable member to open said valve seat for the relief outlet to effect fluid communication between said chamber and said relief outlet, whereby said valve seat is opened without needing to overcome a pressure differential across the relief valve seat caused by a lower pressure existing in the relief outlet.

2. A device for preventing back flow in fluid supply systems which comprises a casing enclosing a fluid chamber therein, means defining a fluid inlet to said chamber, means defining a fluid outlet from said chamber, means defining a fluid relief outlet from said chamber between said inlet and said outlet, a reciprocable member slidably mounted within said body member, means defining a bore through said reciprocable member, said bore having an upstream end and a downstream end, the upstream end of said bore being in flow communicate on with said inlet, a valve seat for said inlet being provided at the downstream end of said bore, a valve member mounted in said chamber, a biasing means for said valve member to bias said valve member to close against said valve seat, a sleeve member mounted in said chamber and coaxially and radially outwardly of said valve seat, said sleeve member having an upstream end, a valve seat for said relief outlet formed at the upstream end of said sleeve member, resilient means provided on the upstream face of the valve member for engagement with the valve seat for the inlet and further resilient means provided on the downstream face of said reciprocable member radially outwardly of the valve seat for the inlet, said reciprocable member being movable to bring said further resilient means into engagement with said valve seat for the relief outlet by pressure on its upstream face and being movable to open the valve seat for the relief outlet when pressure build-up in the chamber due to back flow exceeds a further predetermined pressure, the effective pressure area on said upstream face being substantially equivalent to the effective pressure area of the valve seat for the relief outlet, the arrangement being such that said pressure build-up and said bias first moves its valve member to close off said inlet before movement of said reciprocable member to open said valve seat for the relief outlet to effect fluid communication between said chamber and said relief outlet, whereby said valve seat is opened without need to overcome pressure differential across the relief valve seat caused by a lower pressure existing in the relief outlet.

3. The device as claimed in claim 1, in which the reciprocable member engageable with the valve member when the fluid inlet is closed is provided with a bore extending therethrough, the bore having an upstream end in flow communication with said inlet, the reciprocable member having a downstream face, resilient means provided on the downstream face of said reciprocable member engaging with the relief valve seat to close off communication between said chamber and said relief valve outlet, with said valve member being engageable with said resilient means to close off communication between said chamber and the inlet.

4. The device for preventing back flow in fluid supply systems as claimed in claim 1, in which said reciprocable member engageable with the valve member when the fluid inlet is closed comprises a member reciprocable within a portion of said body member adjacent said inlet, a dynamic seal means being provided in the form of an O-ring seal engaging between the outer periphery of said reciprocable member and said portion of the body member within which said member reciprocates.

* * * * *